United States Patent [19]

Yamasawa et al.

[11] 4,346,476
[45] Aug. 24, 1982

[54] A/D, D/A CONVERTER FOR PCM TRANSMISSION SYSTEM

[75] Inventors: Masao Yamasawa, Sagamihara; Michinobu Ohhata, Kawasaki; Toshi Ikezawa, Yokohama, all of Japan

[73] Assignee: Fujitsu Limited, Kawasaki, Japan

[21] Appl. No.: 152,556

[22] Filed: May 23, 1980

[30] Foreign Application Priority Data

May 30, 1979 [JP] Japan .................................. 54-66121

[51] Int. Cl.³ ............................................ H04L 7/04
[52] U.S. Cl. ....................................... 375/8; 370/100; 375/25; 375/120
[58] Field of Search ...................... 375/8, 25, 120, 119, 375/118; 370/100

[56] References Cited

U.S. PATENT DOCUMENTS

| 3,505,478 | 4/1970 | Kaneko | 370/100 |
| 4,019,153 | 4/1977 | Cox, Jr. et al. | 375/120 |
| 4,180,701 | 12/1979 | Louth et al. | 375/120 |
| 4,215,430 | 7/1980 | Johnson, Jr. | 375/120 |

Primary Examiner—Glen R. Swann, III

[57] ABSTRACT

A codec, utilized for an PCM transmission system, has an a/d and d/a converter, and a digital phase locked loop circuit. The digital phase locked loop circuit generates internal operation clocks, which are used for the a/d and d/a converting operations, by dividing the frequency of the applied external clocks by a value determined in accordance with the frequency ratio between frame pulses and the external clocks.

9 Claims, 3 Drawing Figures

A/D, D/A CONVERTER FOR PCM TRANSMISSION SYSTEM

BACKGROUND OF THE INVENTION

The present invention relates to a per-channel codec for a PCM (pulse-code modulation) transmission system.

A codec is utilized for translating (encoding) an analogue voice signal into an appropriate PCM code at a channel's transmission end, and for restoring (decoding) the analogue voice signal from the transmitted digital data at the receiving end. In these a/d and d/a conversions, the codec requires operation clocks (coding and decoding clocks) which are produced more than a predetermined number of times (for example, more than twelve times) per period of sampling pulses (frame pulses).

In a conventional codec, since the operation clocks are formed by a fixed frequency divider to which read/write clocks for a input/output register of the codec are applied, the frequency of the operation clocks is fixed at a certain value which is determined by the frequency of the read/write clocks and also by the dividing ratio of the fixed frequency divider. Therefore, the conventional codec cannot be commonly adopted in various transmission systems which use read/write clocks having respective frequencies which are different from one another.

In order to solve the above-mentioned problem, there is known a codec which is provided with plural fixed frequency dividers having dividing ratios which are different from each other and a selection circuit, and which obtains the operation clocks by selectively applying the read/write clocks to the appropriate fixed frequency divider. However, this codec requires many fixed frequency dividers and requires an additional signal for selecting the divider. Furthermore, in order to make the best use of a sampling period, during the a/d and d/a conversion, it is necessary that all of the dividers of this codec be designed in different circuit constructions. As a result, not only does the circuit design become difficult, but also, the hardware of the codec becomes complex.

SUMMARY OF THE INVENTION

It is, therefore, an object of the present invention to provdide a codec which can be commonly adopted in transmission systems which use read/write clocks having a frequency different from one another.

Another object of the present invention is to provide a codec which can make the best use of an entire period of the sampling pulses during the a/d and d/a conversion.

A further object of the present invention is to provide a codec which can be constructed of very simple hardware.

According to the present invention a codec comprises an a/d and d/a conversion circuit, responding to frame pulses and internal operation clocks, for coding an analogue signal to a PCM digital signal and for decoding a PCM digital signal to an analogue signal, and a digital phase locked loop circuit for generating the internal operation clocks by dividing the frequency of applied external clocks by a value which is determined in accordance with a frequency ratio between the frame pulses and the external clocks.

Since the internal operation clocks are generated by dividing the frequency of applied external clocks by a value which is determined in accordance with a frequency ratio between the frame pulses and the external clocks, the codec according the present invention: can be commonly adopted in transmission systems which are use external clocks, in other words, read/write clocks, having respective frequencies which are different from one another; can make the best use of the entirety of a sampling period during a/d and d/a conversion; and can be constructed of simple hardware.

The aforementioned and other related objects and features of the present invention will be apparent from the following description of the present invention, with reference to the accompanying drawings, as well as from the appended claims.

DESCRIPTION OF THE PREFERRED EMBODIMENTS

Figure 1:
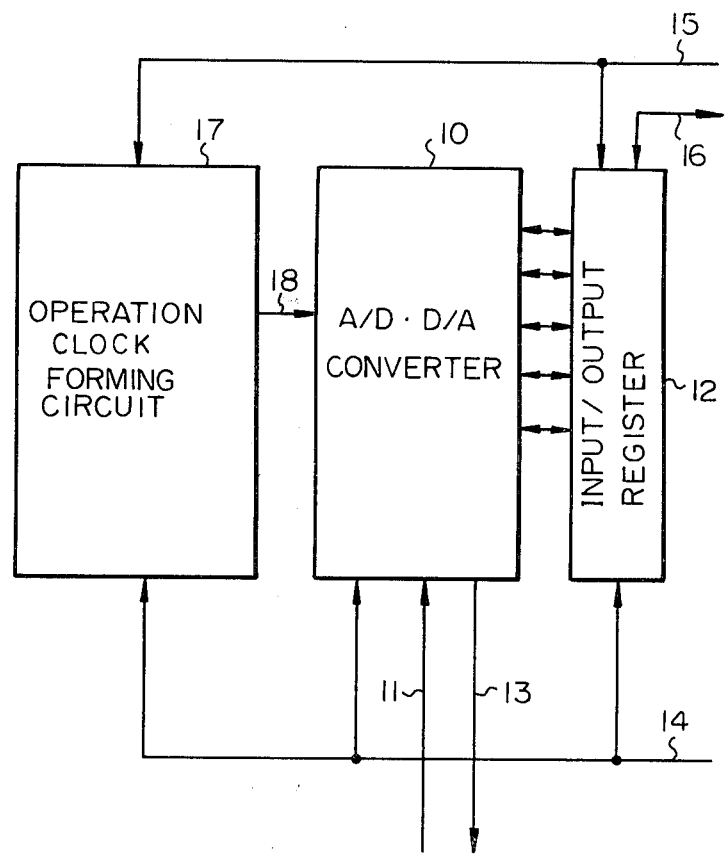
FIG. 1 is a block diagram illustrating a codec according to the present invention.

Referring to FIG. 1, reference numeral 10 denotes an a/d and d/a converter (coding and decoding circuit). When functioning as a coder, the a/d and d/a converter 10 encodes an analogue signal such as a voice signal, into a PCM signal, and then, simultaneously transmits all the bits of the PCM signal to an input/output register 12. When functioning as a decoder, the converter 10 decodes a PCM signal applied from the input/output register 12 into an analogue signal and then, outputs the obtained analogue signal via a line 13.

The input/output register 12 converts the PCM coded digital signal from serial form to parallel form, and vice versa, in response to sampling pulses of 8 KHz applied thereto via line 14 and in response to read/write pulses applied thereto via a line 15. The PCM coded digital signal is transmitted serially via a line 16.

The a/d and d/a converter 10 carries out the a/d or d/a conversion in response to operation clocks applied from an operation clock forming circuit 17 via a line 18.

The operation clock forming circuit 17 is composed of a digital PLL (phase-locked loop) circuit which divides the frequency of the sampling pulses applied thereto via the line 14 by a set number. In the dividing operation of the circuit 17, the read/write clocks applied thereto via the line 15 are utilized for counting clocks.

Figure 2:
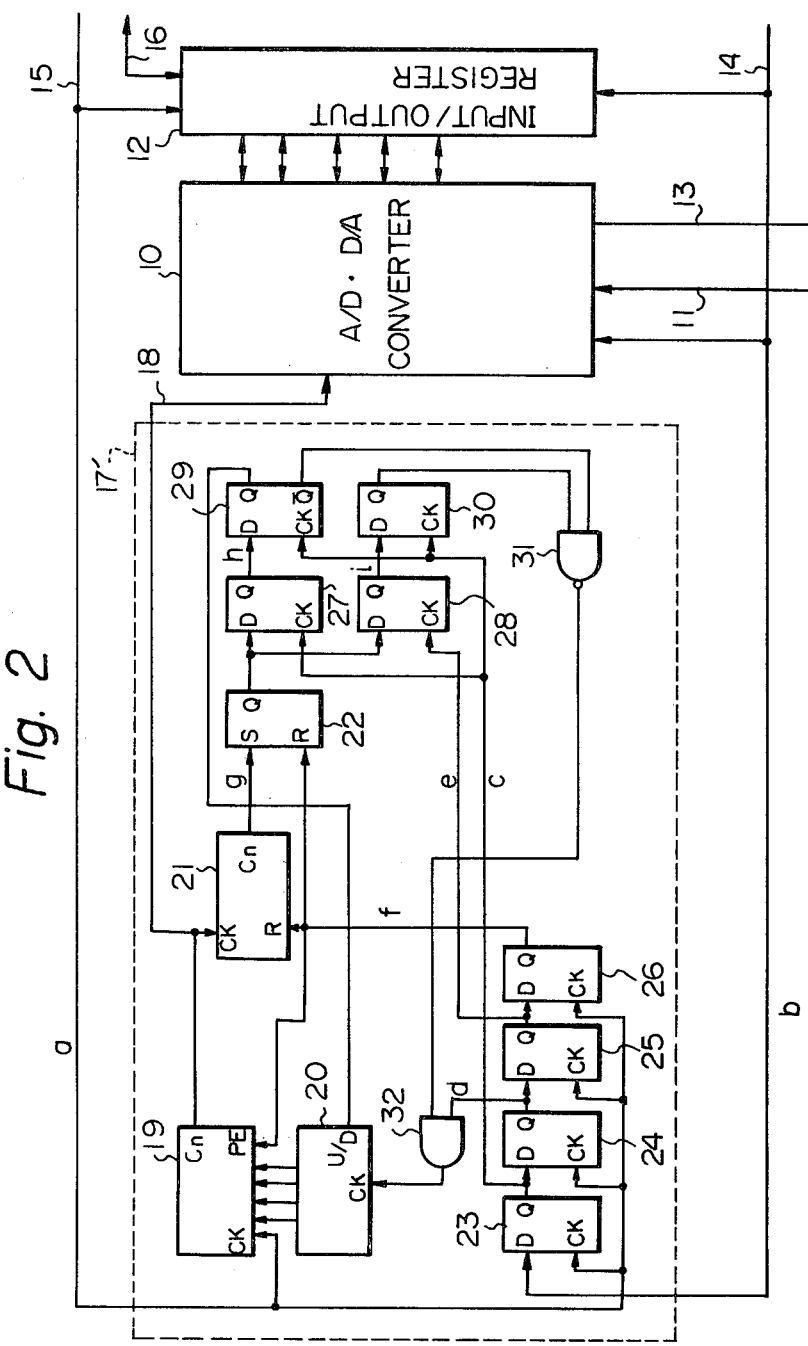
FIG. 2 is a block diagram illustrating an embodiment of the codec according to the present invention, wherein the operation clock forming circuit is illustrated in detail.

FIG. 2 illustrates an embodiment of the codec according to the present invention, and particularly illustrates in detail the construction of a preferred embodiment 17' of the operation clock forming circuit 17. The detailed construction of the codec according to the present invention will now be explained.

Circuit elements of the codec illustrated in FIG. 2 are the same as those of the codec in FIG. 1, except for the details of operation clock forming circuit 17'. In the operation clock forming circuit 17', a counter 19 which is composed of a presettable down counter receives output from an up/down counter 20 as a preset input. The present count of the counter 19 is decreased one count each time the read/write clock enters until the count reaches zero. When the count of the counter 19 arrives at zero, a carry output is produced and is transmitted to the a/d and d/a converter 10 via the line 18 as an operation clock. This carry output is also transmitted to a binary counter 21 as a counting clock. The counter 21 is constructed so as to produce a carry output when the sum of the carry outputs applied thereto from the counter 19 equals a number equivalent to a predetermined frequency division factor. A positive edge triggered R-S flip-flop 22 is set by this carry output from the counter 21 and then reset by a pulse applied from a D flip-flop 26. The positive edge of the pulse from the D flip-flop 26 is delayed by a certain number of clock pulse periods from the positive edge of the sampling pulse. The direction of the counting mode of the up-/down counter 20 is switched in accordance with the level of the Q output of the R-S flip-flop 22. The up-/down counter 20 counts the number of pulses which are applied from a D flip-flop 24 and delayed by a certain number of clock pulse periods from the positive edge of the sampling pulses.

D flip-flops 23 and 25, as well as the D flip-flop 24 and 25, produce pulses c, e, d, and f respectively, each of which has a positive edge delayed by respectively corresponding number of successive clock pulse periods from the positive edge of each of the sampling pulses. D flip-flops 27, 28, 29, and 30, a NAND gate 31, and an AND gate 32 constitute a circuit for forming an insensitive operation area of phase control so as to stabilize the phase-locked loop control operation.

Operation of the operation clock forming circuit 17' will now be described with additional reference to the time chart of FIG. 3.

Figure 3:
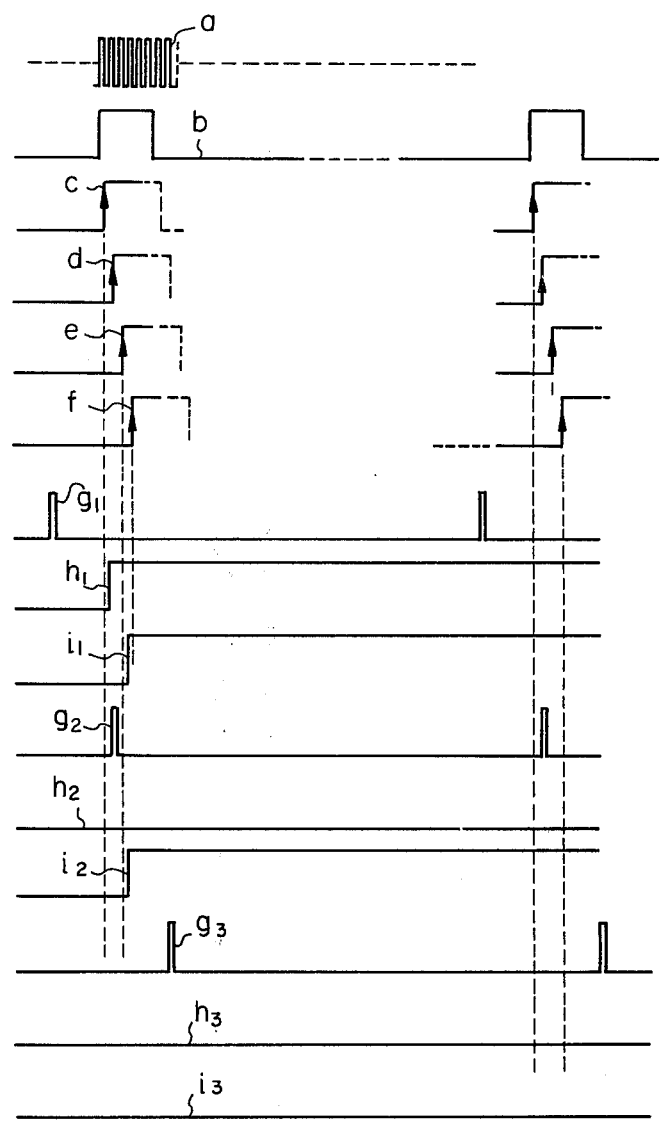
FIG. 3 is a time chart of the operation clock forming circuit illustrated in FIG. 2.

The read/write clocks a, for example, of 640 KHz, indicated in FIG. 3, are applied to the clock imput terminals of the counter 19 and of the D flip-flops 23, 24, 25, and 26. Therefore, if the sampling pulses b, for example, of 8 KHz are applied to the input terminal D of the flip-flop 23, the pulses c, d, e, and f indicated in FIG. 3 are produced in sequence from the output terminals of the D flip-flops 23, 24, 25, and 26, respectively.

If the pulse f from the D flip-flop 26 is applied to the parallel enable terminal PE of the counter 19, the counter 19 receives the output data of the up/down counter 20, for example the data corresponding to the number "5", and then the counter 19 starts at the received count and decreases one count each time the read/write clock a enters until the counter reaches zero. Therefore, if the output data of the up/down counter 20 corresponds to "5", the frequency of the carry output from the counter 19 is one fifth of the frequency of the read/write clock a. In a case where the frequency of the clock a is 640 KHz, the frequency of the carry output from the counter 19 becomes 128 KHz.

The carry output from the counter 19 is applied to the binary counter 21, which functions as a divider having a fixed division factor, for example, a factor of "16". Therefore, the carry output g from the counter 21 has a frequency which is one sixteenth of the frequency of the carry output from the counter 19. The carry output g is applied to the set input terminal of the flip-flop 22.

The counting operation of the up/down counter 20 is selectively determined in accordance with the phase relationship of the carry output g, the positive edges of the pulse c and the positive edge of the pulse e.

In the case where a carry output $g_1$ from the counter 21 appears earlier than both of the positive edges of the pulses c and e as indicated in FIG. 3, that is, in the case where the frequency of the carry output $g_1$ is higher than the frequency of the sampling pulses b, Q outputs $h_1$ and $i_1$ from the D flip-flops 27 and 28 respond as indicated in FIG. 3, respectively. Namely, in such a case, the output $h_1$ assumes the level of "1" at the positive edge of the pulse d, which is used for a clock applied to the up/down counter 20. Therefore, in such a case, the up/down counter 20 operates in the up-counting mode, so as to increase one count each time the pulse d enters, and then the counter 20 transmits the content thereof to the counter 19 in response to the pulse f. As a result, the division factor of the counter 19 for dividing the frequency of the clock a becomes larger, and the output frequency of the counter 21 is lowered.

In the case where a carry output $g_2$ from the counter 21 appears between the positive edges of the pulses c and e as indicated in FIG. 3, Q outputs $h_2$ and $i_2$ from the D flip-flops 27 and 28 respond as indicated in FIG. 3. Namely, the outputs $h_2$ and $i_2$ respectively maintain the levels of "0" and "1" in the next sampling period. As a result, in such a case, since the levels of both the Q output from the D flip-flop 29 and the $\overline{Q}$ output from the D flip-flop 30 become a level of "1", and thus, the output from the NAND gate 31 becomes the level of "0", the AND gate 32 is disabled. Therefore, in such a case, the pulse d is not applied to the up/down counter 20 so as to disable any change in the count of the counter 20 and thus the division factor of the counter 19. In other words, the operation clock forming circuit 17' does not respond to a phase difference of less than a predetermined maximum value as represented by the carry output $g_2$ occurring between the positive edges of the pulses c and e and thus no adjustment of the current count number of the up/down counter 20 is carried out.

In the case where a carry output $g_3$ from the counter 21 appears later than both of the positive edges of the pulses c and e, as indicated in FIG. 3, that is, in case where the frequency of the carry output $g_3$ is lower than the frequency of the sampling pulse b, Q outputs $h_3$ and $i_3$ from the D flip-flops 27 and 28 respectively respond as indicated in FIG. 3. Namely, in such a case, the output $h_3$ maintains the level of "0" at the positive edge of the pulse d. Therefore, in such a case, the up/down counter 20 operates in the down counting mode, so as to decrease one count each time the pulse d enters, and then the counter 20 transmits the content thereof to the counter 19 in response to the pulse f. As a result, the division factor of the counter 19 for dividing the frequency of the clock a becomes smaller, and thus, the output frequency of the counter 21 is raised.

As mentioned hereinbefore, the operation clock forming circuit 17' produces an operation clock, which has a frequency equal to the frequency of the sampling pulse b times a factor determined, in accordance with the division factor of the counter 21, from the read/write clock a by a phase control loop for increasing and decreasing the division factor of the counter 19. Therefore, if the frequency of the read/write clock varies, the frequency of the operation clock used for a/d and d/a conversion is always automatically controlled to be a frequency which has a predetermined multiplicative factor relationship to the sampling pulse frequency. As a result, the codec according to the present invention can carry out a/d and d/a conversion making the best use of an entire period of the sampling pulses, and furthermore, the codec can be commonly adopted in transmission systems which use read/write clocks having different frequencies from one another.

As many widely different embodiments of the present invention may be constructed without departing from the spirit and scope of the present invention, it should be understood that the present invention is not limited to the specific embodiment described in this specification, except as defined in the appended claims.

What is claimed is:

1. A codec for a PCM transmission system for converting analog signals to serial digital signals for transmission by the PCM system and for converting serial digital signals received by the PCM system to analog signals, said codec being responsive to frame pulses of a predetermined frequency defining the rate of sampling of the analog signal, the conversion of digital words corresponding to analog samples to serial digital signals and the reverse conversion of serial digital signals as received to digital words for conversion to analog signals, and to read/write clocks of a predetermined frequency defining the timing of the conversion of parallel digital signals of said digital words to serial digital signals for transmission and the reverse conversion thereof, comprising:
    a digital phase locked loop circuit for generating internal operation clocks by dividing the frequency of said read/write clocks by a value which is determined in accordance with the frequency ratio between said frame pulses and said read/write clocks, and
    an a/d and d/a conversion means responsive to said frame pulses and said internal operation clocks, for coding an analog signal to a PCM digital signal for transmission and for decoding a received PCM digital signal to an analog signal.

2. A codec as claimed in claim 1, wherein said digital phase locked loop circuit comprises:
    first means for dividing the frequency of said read/write clocks by a dividing ratio, so as to produce said internal operation clocks;
    second means for dividing the frequency of said internal operation clocks produced by said first means by a predetermined value, to produce divided pulses;
    third means for comparing the phase of said divided pulses from said second means with the phase of said frame pulses; and
    fourth means for controlling the dividing ratio of said first means in accordance with the result of said phase comparison by said third means, so as to maintain any phase difference between said divided pulses and said frame pulses at less than a predetermined maximum value.

3. A codec as claimed in claim 2, wherein said first means comprises a presettable down counter which is set at a preset count corresponding to the dividing ratio controlled by said fourth means, and is responsive to said read/write clocks to decrease the present count thereof by one count in response to each successive read/write clock until the count thereof reaches zero.

4. A codec as claimed in claim 2, wherein said second means comprises a binary counter responsive to said internal operation clocks, to increase the count thereof by one count in response to each successive said internal operation clock until the count thereof reaches a predetermined count.

5. A codec as claimed in claim 2, wherein said third means comprises a latch circuit which is set by the divided pulses from said second means and reset responsive to said frame pulses.

6. A codec as claimed in claim 2, wherein said fourth means comprises an up/down counter which is responsive to said third means and which is switched to change the direction of the counting mode in accordance with the result of said phase comparison by said third means, the contents of said up/down counter establishing the dividing ratio of said first means.

7. A codec as claimed in claim 2, wherein said fourth means is responsive to a phase difference of greater than said predetermined maximum value for correspondingly increasing or decreasing the value of the dividing ratio of said first means so as to control the phase difference between said divided pulses and said frame pulses to be less than said predetermined maximum value, and is responsive to a phase difference between said divided pulses and said frame pulses of less than said predetermined maximum value to maintain the current dividing ratio value.

8. The codec of claim 3, wherein:
    said second means comprises a binary counter responsive to said internal operation clocks to increase the count thereof by one count in response to each successive said internal operation clock until the count thereof reaches a predetermined count;
    said third means comprises a latch circuit which is set by the divided pulses from said second means and which is reset by each of the said frame pulses;
    said fourth means comprises an up/down counter which is responsive to the result of said phase comparison by said third means to change the direction of counting thereof in accordance with the result of said phase comparison, the count of said up/down counter determining the dividing ratio of said first means; and
    said fourth means further including control means responsive to a phase difference of greater than said predetermined maximum value for correspondingly increasing or decreasing the value of the dividing ratio of said first means so as to control the phase difference between said divided pulses and said frame pulses to be less than said predetermined maximum value, and is responsive to a phase difference between said divided pulses and said frame pulses of less than said predetermined maximum value to maintain the current dividing ratio value.

9. A codec as claimed in claim 3, wherein said first means further is responsive to said frame pulses to be reset to said preset count at a predetermined time following each said frame pulse subsequent to the count of said first means reaching zero.

* * * * *

UNITED STATES PATENT AND TRADEMARK OFFICE
CERTIFICATE OF CORRECTION

PATENT NO. : 4,346,476
DATED : August 24, 1982
INVENTOR(S) : Yamasawa et al.

It is certified that error appears in the above-identified patent and that said Letters Patent is hereby corrected as shown below:

Col. 1, line 49, "provdide" should be --provide--;

Col. 2, line 7, delete "are"' line 38, delete "then,";

Col. 3, line 19, after "pulses" insert --d--;

line 36, "imput" should be --input--;

Col. 5, line 19, after "signals" insert --,--;

line 20, after "received" insert --,--.

Signed and Sealed this

First Day of February 1983

[SEAL]

Attest:

GERALD J. MOSSINGHOFF

Attesting Officer  Commissioner of Patents and Trademarks